June 1, 1937. H. W. RUPPLE 2,082,081
AUTOMATIC METALWORKING MACHINE
Filed Nov. 2, 1934 3 Sheets-Sheet 2
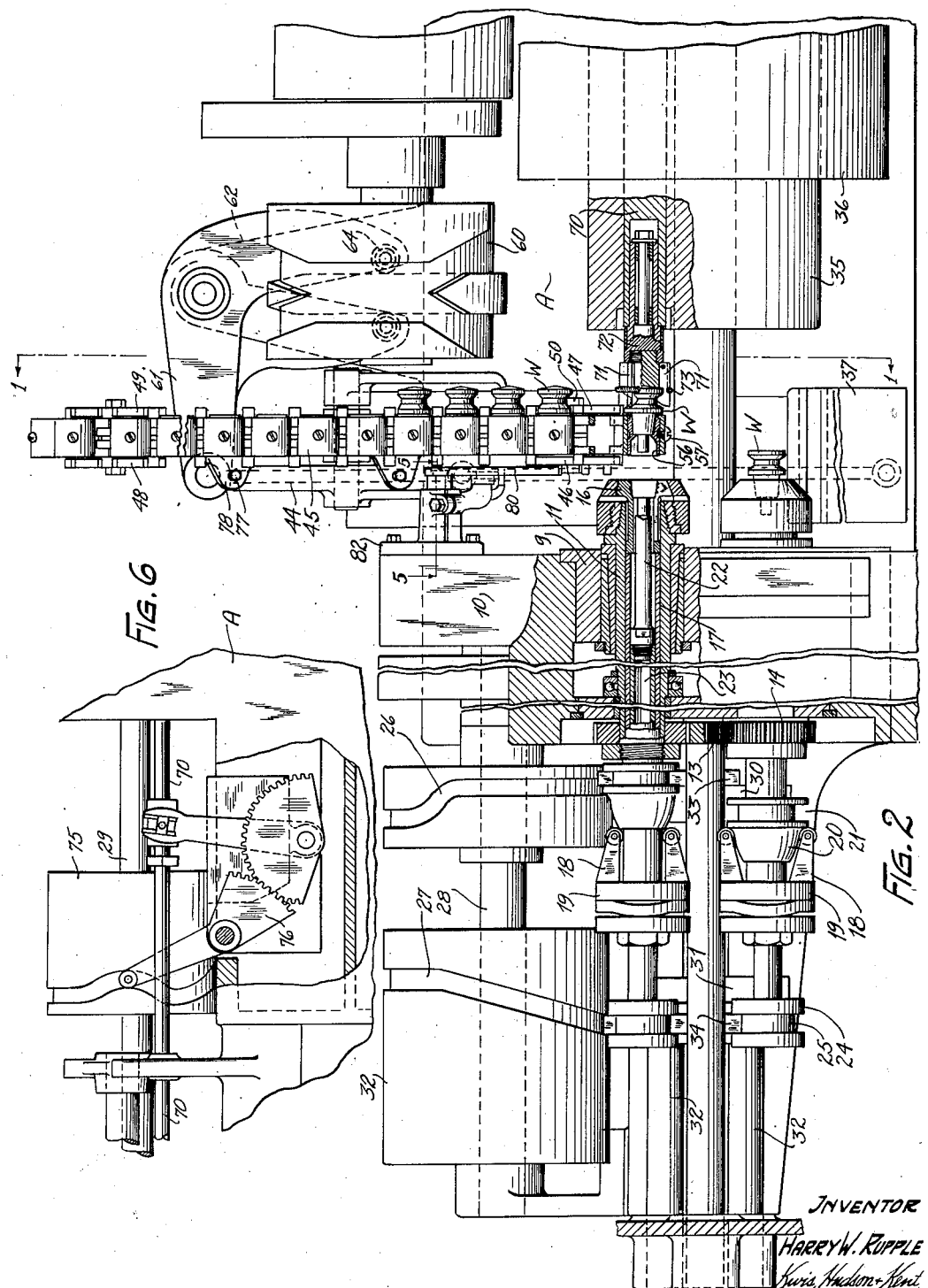
INVENTOR
HARRY W. RUPPLE
Kwis, Hudson + Kent
ATTORNEYS June 1, 1937. H. W. RUPPLE 2,082,081
AUTOMATIC METALWORKING MACHINE
Filed Nov. 2, 1934 3 Sheets-Sheet 3
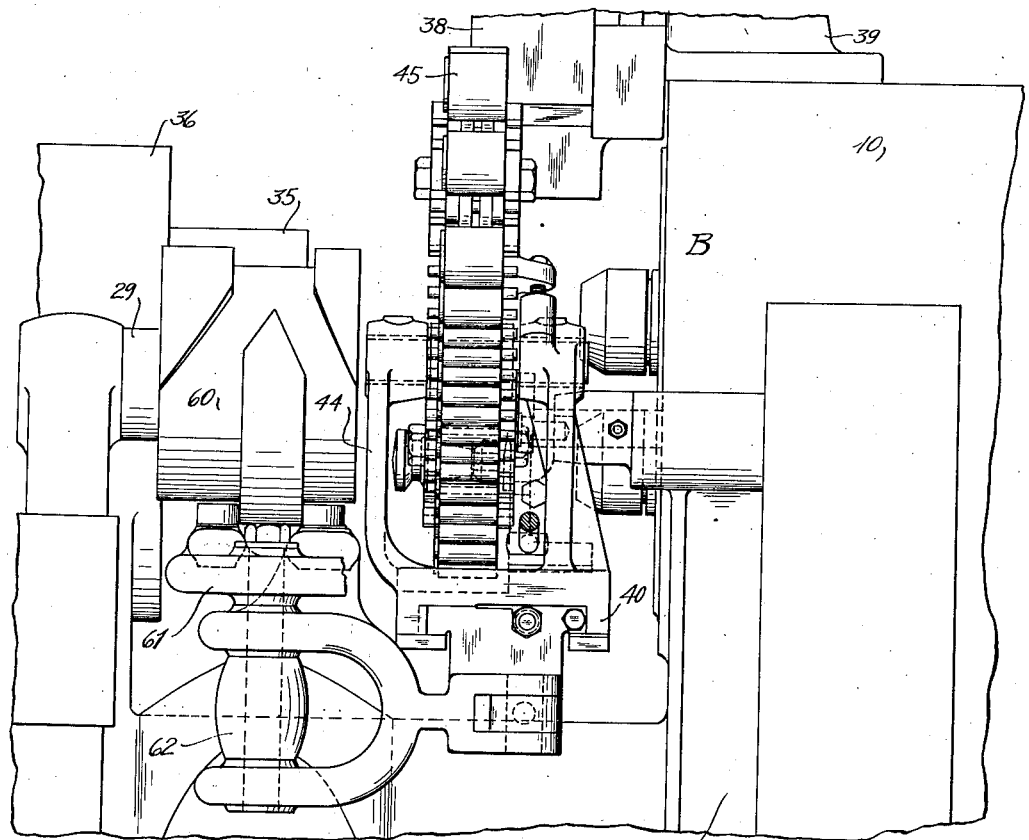
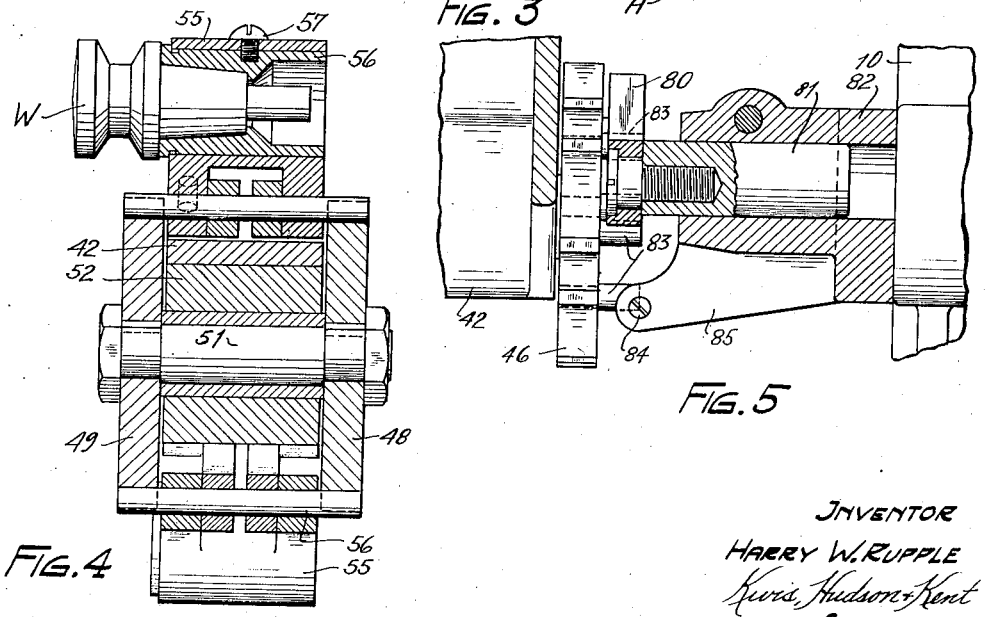
INVENTOR
HARRY W. RUPPLE
ATTORNEYS Patented June 1, 1937

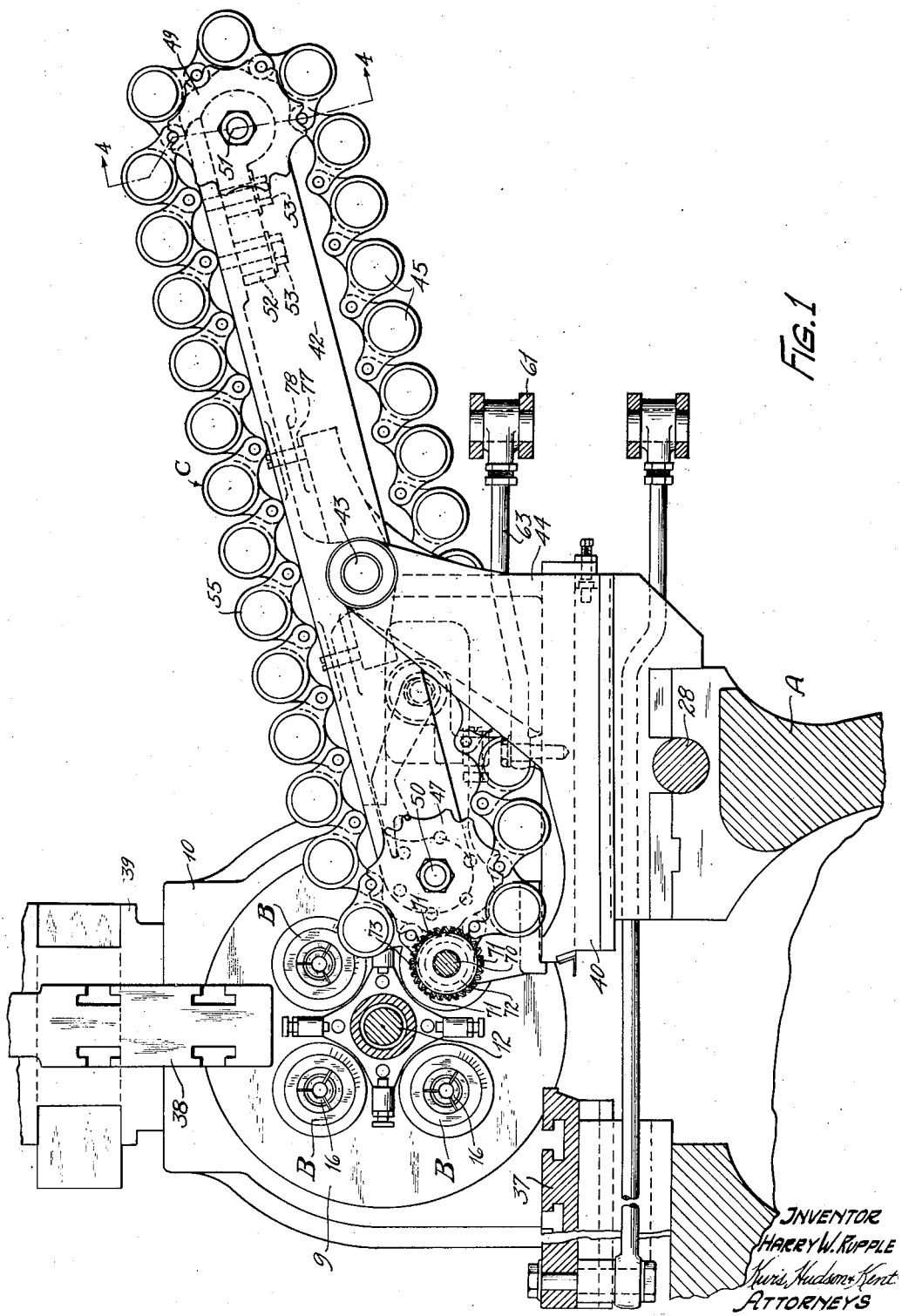

2,082,081

UNITED STATES PATENT OFFICE 2,082,081

AUTOMATIC METALWORKING MACHINE

Harry W. Rupple, Shaker Heights, Ohio, assignor to The Cleveland Automatic Machine Company, Cleveland, Ohio, a corporation of Ohio Application November 2, 1934, Serial No. 751,212

10 Claims. (Cl. 29—38)

The present invention relates to automatic metal working machine tools, and particularly to mechanical feeding of chucking mechanism for either single, or multiple spindle indexible spindle turret types of chucking machines.

Machines of the general character referred to comprise one or a plurality of work spindles, provided with work holding chucks at the front end thereof, rotatably supported in the machine frame or in the case of an indexible spindle turret type of machine, in an indexible turret. In the latter type of machine the turret is periodically indexed to carry the spindles successively through a plurality of tool stations where predetermined operations are performed on work blanks supported in the spindle chucks. In either type of machine the tools are usually carried by a main tool slide, cross slides and/or head slides, depending upon the particular construction of machine and the operations to be performed on the work blanks. The finished work blanks are removed from and rough blanks inserted in the chuck or chucks, an operation usually referred to as chucking, at predetermined intervals in timed relation to the other operations of the machine. In the indexible spindle turret type of machine the chucking operation is performed at one of the stations from which the tools are usually omitted as the spindles are successively indexed therethrough. This station is commonly referred to as the chucking or loading station.

An object of the present invention is the provision of a novel automatic mechanical feeding or chucking mechanism for supplying blanks to the work spindle or spindles of a single or multiple spindle chucking machine of the character referred to.

Another object of the invention is the provision of a novel automatic feeding or chucking mechanism for supplying blanks to the work spindles of a multiple spindle indexible turret type of chucking machine at the loading station, which comprises a link conveyor of novel construction adapted to carry a plurality of work blanks and novel means for transferring the blanks from the conveyor to the spindle chucks.

Another object of the invention is the provision of a novel automatic metal working machine of the chucking type comprising automatic blank feeding or chucking mechanisms for periodically feeding or positioning blanks in the machine.

Another object of the invention is the provision of a novel automatic metal working machine of the multiple work spindle, indexible work spindle turret type of chucking machine comprising automatic mechanical blank ejecting and feeding or chucking mechanism for periodically feeding blanks to the work spindle in the loading station.

The invention resides in certain novel features and details of construction and combinations and arrangements of parts, and further objects and advantages thereof will be apparent to those skilled in the art to which it pertains, from the following description of the preferred embodiment thereof described with reference to the accompanying drawings, in which Fig. 1 is a section of an automatic metal working machine embodying the present invention approximately on the line 1—1 of Fig. 2.

Fig 2 is a plan with portions shown in horizontal section taken approximately through the axis of the lower rear spindle.

Fig. 3 is a rear elevation of part of the machine shown in Figs. 1 and 2.

Fig. 4 is a section on the line 4—4 of Fig. 1 through the upper sprocket wheels of the conveyor.

Fig. 5 is a section on the line 5—5 of Fig. 2, and

Fig. 6 is a front elevation of part of the machine with portions broken away showing the mechanism for operating part of the chucking apparatus.

Similar reference characters designate corresponding parts throughout the several views of the drawings.

The invention is particularly applicable to a multiple spindle indexible work spindle turret type of chucking machine and is herein described and illustrated as embodied in a four spindle, indexible work spindle turret type of "Cleveland automatic" chucking machine, and only those parts of the machine which are necessary to a clear understanding of the invention are illustrated and described. The remainder of the machine is old and well known in the art and may be found embodied in a plurality of different structures Referring to the drawings, a plurality of work spindles B, in the present instance four, are rotatably supported in longitudinal apertures in a work spindle turret 9 rotatably supported in a spindle turret head 10 on the frame of the machine designated in general by the reference character A. The spindles are equally spaced about the axis of rotation of the turret and are successively carried through the chucking and work stations upon the indexing of the turret.

The spindles B are identical in construction and comprise a spindle tube 11 rotatably supported by suitable bearings provided with means for taking up wear, etc. The spindle tubes 11 are similar to those illustrated in U. S. Patent No. 1,950,931 and are rotatably supported in the spindle turret 9 and driven from the main drive shaft 12 of the machine through the medium of gears 13 and 14 in a similar manner.

Each of the spindles B comprises a "push-out" type collet chuck 16 of conventional construction slidably supported in the front end of the spindle tube 11. The interior or work engaging surface of the spring fingers of the collet chucks are formed or shaped to accommodate the contour of the particular piece of work being operated upon which, in the present embodiment of the invention, is tapered. At the loading station which, as illustrated, is the lower rear portion, the chuck collets 16 are actuated to release the work held therein and grip a new blank presented thereto through the medium of chuck tubes 17, the front ends of which abut the rear ends of the chuck collets. The construction of the chuck tubes 17 and the operating mechanism therefor, including chuck fingers 18 pivotally supported in finger blocks 19 slidably supported on the spindle tubes 11, and chuck thimbles 20 provided with annular grooves 21 also slidably supported on the spindle tubes 11, are the same as those illustrated in the aforesaid patent and operate in a similar manner.

When the collet chucks 16 are released the finished work is ejected therefrom by ejectors 22 attached to the front end of ejector tubes 23 slidably supported within the chuck tubes 17, the rear ends of which are provided with heads 24 having an annular groove 25 therein. The chuck thimbles 20 and the ejector tubes 23 are under the control of cam plates on cam drums 26 and 27 fixed to an auxiliary cam shaft 28 driven from the main cam shaft 29 for the machine in any conventional manner, and are actuated in predetermined timed relation to each other and to the other operations of the machine by mechanism similar to that illustrated and described in my copending application Serial No. 727,761. This mechanism comprises members 30 and 31 slidably supported on the parallel rods 32 secured in the machine frame A, provided with brass shoe plates 33 and 34, respectively, which project into the annular grooves 21 and 25, respectively, at the loading station.

In the preferred embodiment of the machine illustrated the tools are carried by a main tool slide 35 slidably supported in a tool slide head 36, a front cross slide 37 supported on suitable ways formed on the frame A, and a head slide 38 slidably supported by the bracket 39 fixed to the spindle head 10. The rear cross slide 40 which is similar in construction to the front cross slide 37 is employed to support a blank magazine hereinafter referred to. The tool slides are all of conventional construction and are operated in a manner well known in the art and a detailed description thereof is considered unnecessary. The spindle turret 9 is periodically indexed to successively move the spindles B through the various stations, including the loading station, by mechanism well known in the art, and the blank magazine designated in general by the reference character C, is provided for the purpose of automatically feeding blanks designated by the reference character W to the spindles at the loading station as they are successively indexed therethrough.

The blank magazine C comprises a frame member 42 pivotally supported on a shaft 43 secured in a bracket 44 formed integral with the rear cross slide 40, and an endless chain conveyor 45 supported on a plurality of sprocket wheels 46, 47, 48 and 49. Sprocket wheels 46 and 47 are carried by a short shaft 50 rotatably supported in the lower end of the frame 42, and the sprocket wheels 48 and 49 are carried on a shaft 51 rotatably supported in a bracket 52 adjustably secured to the frame 42, for the purpose of taking up slack in the endless conveyor 45, by means of bolts 53 threaded into the frame 42 and extending through elongated slots in a bracket 52. The endless conveyor 45 is made up of links 55, secured together by pintle pins 56, having longitudinal apertures extending therethrough within which blank holding bushings 57 are secured by means of set screw 58. The interior of the bushings 57 is formed to the contour of the work blanks which are manually inserted therein at the outer or upper end of the magazine.

The conveyor C is under the control of, and is reciprocated bodily transversely of the longitudinal axis of the machine in predetermined timed relation to the other operations thereof including the actuation of the chuck in the loading station, by cam plates, on a cam drum 60 on the main cam shaft 29 of the machine, operatively connected thereto through the medium of a bell crank lever 61 pivotally supported at the rear of the machine by a horn 62 on the frame A, an adjustable link 63 pivotally connected to cross slide 40 and one arm of the bell crank lever 61, and a cam roller 64 on the other arm of the bell crank lever which engages in the groove formed by the cam plates on the cam drum 60.

When the magazine C is in its forward position, that is the position illustrated in the drawings, the lower work blank W' is in axial alignment with the spindle in the loading station. With the parts in this position an accelerated shaft or spindle 70 supported in the main tool slide 35 and provided with a plurality of gripping fingers 71 pivotally supported in a block 72 and normally held in closed position by a spring 73, is advanced to engage the projecting end of the work blank W'. After the work blank W' has been engaged within the finger 71 the accelerated spindle 70 is retracted, withdrawing the work blank from the conveyor, after which the magazine C is moved to its rear position and the accelerated spindle advanced to position the work blank carried thereby in the chuck collet 16, whereupon the collet is actuated to grip the work blank and the accelerated spindle withdrawn. The accelerated spindle 70 is actuated from a cam drum 75 on the main cam shaft 29 of the machine through the medium of linkage designated in general at 76, see Fig. 6, in a manner well known in the art.

The forward position of the magazine C and, in turn, the lower work blank W', can be adjusted by varying the length of the link 63, and the vertical position thereof can be adjusted, to bring the work blank into axial alignment with the accelerated spindle which in turn is in axial alignment with the spindle B in the loading station by rotating the frame member 42 about the shaft 43, by means of adjusting screws 77 threaded into projections 78 on one side of the frame member, the ends of which abut projections on the bracket 44.

Upon each reciprocation of the magazine C the endless conveyor 45 is advanced a predetermined distance to bring a new work blank into feeding position, by the engagement of a forked end of a pawl lever 80 pivotally supported on a screw eccentrically carried by a cylindrical member 81 secured in a bracket 82 bolted or otherwise fixed to the turret head 10, with one of a plurality of pins 83 secured to the side of the sprocket wheel 46. The operation of the lever 80 and the pins 83 is similar to that of a pawl and ratchet. The amount of advance imparted to the conveyor 45 upon each reciprocation of the magazine can be adjusted by turning the eccentric pin 81 in the bracket 82 after which it is secured in the desired position. Overrun of the conveyor 45 is prevented by an adjustable stop 84 threaded into an arm 85 on the bracket 82 and positioned to engage one of the lower pins 83 when the magazine is in its rear position.

It is believed that the operation of the machine will be apparent from the foregoing description thereof, suffice it to say that with the parts in the position shown in the drawings, the collet chuck 16 in the loading station is open, the magazine C is in its forward position with the lower work blank W' in axial alignment with the accelerated spindle 70 and the work spindle B in the loading station, and the accelerated spindle 70 is advanced with the work gripping jaws 71 thereof in engagement with the work blank W' preparatory to withdrawing the same from the conveyor. Upon continued operation of the machine the accelerated spindle 70 moves towards the right, as viewed in Fig. 2, carrying the work blank W' free of the conveyor 45, after which the magazine C is moved to its rear position and the accelerated shaft or spindle 70 advanced to position the work blank W' in the chuck collet, after which the chuck collet 16 is closed and the accelerated spindle withdrawn. Upon the rearward movement of the magazine C the endless conveyor 45 is advanced a predetermined distance to bring the next following blank into feeding position by the action of the lever 80 on one of the pins 83.

During the chucking operation the blanks in the three tool stations are being operated upon by the tools positioned therein, and after the operations in the various stations have been completed, the tools are withdrawn and the spindle turret 9 indexed to advance the spindles B one station and bring the next succeeding spindle into the loading station. As soon as the spindle reaches the loading station the chuck collet and ejector mechanism are actuated to release the work and eject the same from the spindle. Concurrently with this operation the magazine C is moving into its forward position to bring the next succeeding piece of work, which during the interim has been advanced one step as previously described, into axial alignment with the accelerated spindle 70, and the cycle of operation is repeated.

From the foregoing description of the preferred embodiment of the invention it will be apparent that the objects of the invention have been attained. While the invention has been illustrated and described with reference to the preferred embodiment thereof, I do not wish to be limited to the particular construction illustrated and described, which construction may be varied within the scope of this invention. This application is intended to cover all variations, adaptations and uses thereof that come within the knowledge and customary practice of those skilled in the art, and I particularly point out and claim as my invention the following:

1. A blank magazine for a metal working machine of the character referred to comprising a bracket member adapted to be supported adjacent the machine, a frame member pivotally supported by said bracket member for adjustment about a horizontal axis, sprocket wheels rotatably supported at each end of said frame member, and an endless conveyor supported on said sprocket wheels, said conveyor comprising a plurality of links having horizontal apertures therein adapted to receive work blanks.

2. In a machine of the character referred to the combination of a rotatable work carrying spindle, an endless conveyor supported adjacent the spindle, said conveyor comprising a plurality of links provided with apertures adapted to receive work blanks, means for periodically moving said conveyor whereby the work receiving apertures in said links are successively brought into axial alignment with said spindle, and means for transferring work blanks from said links to said spindle.

3. In a machine of the character referred to the combination of a rotatable work carrying spindle, a magazine comprising an endless conveyor supported adjacent said spindle, said conveyor comprising a plurality of links provided with apertures adapted to receive work blanks, means for reciprocating said magazine and means for advancing said endless conveyor whereby the work receiving apertures in said links are successively brought into axial alignment with said spindle, and means for transferring work blanks from the apertures in said links to said spindle.

4. In a machine of the character referred to the combination of a rotatable work carrying spindle, an endless conveyor supported adjacent said spindle adapted to support a plurality of work blanks, means for periodically advancing said conveyor towards said spindle to present a work blank in axial alignment with said spindle, a member slidably supported in axial alignment with said spindle and adapted to grip a work blank, means for advancing said member to engage therein a work blank positioned in axial alignment with said spindle by said conveyor, means for retracting said member to withdraw the blank engaged therein from said conveyor, means for retracting said conveyor after the blank has been withdrawn therefrom, and means for subsequently advancing said member to transfer the blank to said spindle.

5. In a machine of the character referred to the combination of a frame, an indexible spindle turret rotatably supported by said frame, a plurality of spindles rotatably supported in said spindle turret, means for periodically rotating said spindle turret whereby said spindles are indexed through a plurality of stations one of which is a loading station, an endless conveyor supported adjacent the loading station, said conveyor comprising a plurality of links provided with apertures adapted to receive work blanks, means for periodically moving said conveyor whereby the work receiving apertures in said links are successively brought into axial alignment with the spindle in the loading station, and means at the loading station for transferring work blanks from said links to the spindle in the loading station.

6. In a machine of the character referred to the combination of a frame, an indexible spindle turret rotatably supported by said frame, a plurality of spindles rotatably supported in said spindle turret, means for periodically rotating said spindle turret whereby said spindles are indexed through a plurality of stations one of which is a loading station, a magazine comprising an endless conveyor supported adjacent the loading station, said conveyor comprising a plurality of links provided with apertures adapted to receive work blanks, means for reciprocating said magazine and means for advancing said endless conveyor whereby the work receiving apertures in said links are successively brought into axial alignment with the spindle in the loading station, and means at the loading station for transferring work blanks from the apertures in said links to the spindle in the loading station.

7. In a machine of the character referred to the combination of a frame, an indexible spindle turret rotatably supported by said frame, a plurality of spindles rotatably supported in said spindle turret, means for periodically rotating said spindle turret whereby said spindles are indexed through a plurality of stations one of which is a loading station, an endless conveyor supported adjacent the loading station adapted to support a plurality of work blanks, means for periodically causing said conveyor to present a work blank in axial alignment with the spindle in the loading station, a member slidably supported in axial alignment with the spindle in the loading station, means on said member adapted to grip a work blank supported by said conveyor, and means for reciprocating said member whereby a work blank is transferred from said magazine to the spindle in the loading station.

8. In a machine of the character referred to the combination of a work carrying spindle, a bracket supported on the machine frame adjacent said spindle, a frame member pivotally supported by said bracket, a sprocket wheel rotatably supported at each end of said frame member, an endless conveyor supported on said frame member and operatively connected to said sprocket wheels, said conveyor comprising a plurality of links having apertures adapted to support work blanks, means for reciprocating said bracket, means for advancing said conveyor whereby the work receiving apertures in said links are successively brought into axial alignment with said spindle, and means for transferring work blanks from said links to the spindle in the loading station.

9. In a machine of the character referred to the combination of a frame, an indexible spindle turret rotatably supported by said frame, a plurality of spindles rotatably supported in said spindle turret, means for periodically rotating said spindle turret whereby said spindles are indexed through a plurality of stations one of which is a loading station, a bracket supported on the machine frame adjacent said loading station, a frame member pivotally supported by said bracket, an endless conveyor supported by said frame member, said conveyor comprising a plurality of links having apertures adapted to support work blanks, and means for transferring work blanks from said links to the spindle in the loading station.

10. In a machine of the character referred to the combination of a frame, an indexible spindle turret rotatably supported by said frame, a plurality of spindles rotatably supported in said spindle turret, means for periodically rotating said spindle turret whereby said spindles are indexed through a plurality of stations one of which is a loading station, a bracket supported on the machine frame adjacent the loading station, a frame member supported by said bracket, an endless conveyor supported by said frame member, said conveyor comprising a plurality of links having apertures adapted to support work blanks, means for reciprocating said bracket, means for advancing said conveyor whereby the work supporting apertures in said links are successively brought into axial alignment with the spindle in the loading station, and means for transferring work blanks from said links to the spindle in the loading station.

HARRY W. RUPPLE.